(12) United States Patent
Zhang et al.

(10) Patent No.: US 9,743,400 B2
(45) Date of Patent: Aug. 22, 2017

(54) COLLISION AVOIDANCE SYSTEM FOR MOBILE SLOTTED ALOHA PROTOCOL

(75) Inventors: Guoxia Zhang, Shanghai (CN);
Qingshan Zhang, Shanghai (CN);
Zeng Yang, Shanghai (CN)

(73) Assignee: Harman International Industries, Incorporated, Stamford, CT (US)

( * ) Notice: Subject to any disclaimer, the term of this patent is extended or adjusted under 35 U.S.C. 154(b) by 385 days.

(21) Appl. No.: 14/391,951

(22) PCT Filed: Jul. 30, 2012

(86) PCT No.: PCT/CN2012/079324
§ 371 (c)(1),
(2), (4) Date: Oct. 10, 2014

(87) PCT Pub. No.: WO2014/019116
PCT Pub. Date: Feb. 6, 2014

(65) Prior Publication Data
US 2015/0078243 A1    Mar. 19, 2015

(51) Int. Cl.
*H04W 72/04* (2009.01)
*H04B 7/26* (2006.01)
*H04W 72/00* (2009.01)
*H04W 74/08* (2009.01)
*H04W 84/18* (2009.01)

(52) U.S. Cl.
CPC ...... *H04W 72/0446* (2013.01); *H04B 7/2643* (2013.01); *H04W 72/005* (2013.01); *H04W 74/085* (2013.01); *H04W 84/18* (2013.01)

(58) Field of Classification Search
CPC .. H04B 7/2643; H04W 72/005; H04W 84/18; H04W 74/085; H04W 72/0446; H04W 40/02
See application file for complete search history.

(56) References Cited

U.S. PATENT DOCUMENTS

| | | | |
|---|---|---|---|
| 2003/0067892 A1* | 4/2003 | Beyer | H04L 45/20 370/328 |
| 2008/0137556 A1 | 6/2008 | Park et al. | |
| 2009/0201860 A1* | 8/2009 | Sherman | H04L 12/1881 370/329 |

FOREIGN PATENT DOCUMENTS

| | | |
|---|---|---|
| CN | 102316546 A | 1/2012 |
| CN | 102447686 A | 5/2012 |

OTHER PUBLICATIONS

Riccardo Scopigno, "Mobile Slotted Aloha for Vanets", 2009 IEEE.*
ISA State Intellectual Property Office of the People's Republic of China, International Search Report and Written Opinion of PCT/CN2012/079324, May 2, 2013, WIPO, 6 pages.

* cited by examiner

*Primary Examiner* — Ian N Moore
*Assistant Examiner* — Latresa McCallum
(74) *Attorney, Agent, or Firm* — McCoy Russell LLP (57) ABSTRACT

A system for reducing collisions in communications utilizing a media access control (MAC) data communication protocol and/or a time division multiple access-based (TDMA-based) data communication protocol, such as an Aloha protocol or an MS-Aloha protocol, that may include one or more electronic devices (such as electronic devices of a vehicular ad-hoc network (VANET)).

20 Claims, 5 Drawing Sheets

COLLISION AVOIDANCE SYSTEM FOR MOBILE SLOTTED ALOHA PROTOCOL

CROSS REFERENCE TO RELATED APPLICATION

The present application is a U.S. National Phase of International Patent Application Serial No. PCT/CN2012/079324 entitled "COLLISION AVOIDANCE SYSTEM FOR MOBILE SLOTTED ALOHA PROTOCOL," filed on Jul. 30, 2012, the entire contents of which are hereby incorporated by reference for all purposes.

TECHNICAL FIELD

The present disclosure relates to collision avoidance systems for data communication protocols. For example, Mobile Slotted Aloha (MS-Aloha) is a data communication protocol that may be limited by communication collisions.

RELATED ART

MS-Aloha protocol is a wireless network protocol proposed for applications such as vehicle networks. MS-Aloha may be considered a hybrid solution with respect to media access control (MAC) protocols. For example, MS-Aloha may be considered a channel-based/TDMA protocol and a packet-based and collision-free MAC protocol. In short, the MS-Aloha is a connection oriented packet-based and collision-free MAC protocol.

Because MS-Aloha is connection oriented and packet-based, it overcomes some limitations in telephone networks (such as carrier sense multiple access with collision avoidance (CSMA/CA) type networks). Example limitations in telephone networks include limitations at connection set-up phases of a telephone call (such as reservation request, confirmation, data exchange, and teardown). MS-Aloha being packet-based and connection oriented may continuously refresh each reservation simply by transmitting each period of a packet-based communication.

Although MS-Aloha has its advantages, complex networks and scenarios can cause access collision issues in communications utilizing MS-Aloha. Therefore, a need exists for a mechanism that can reduce access collisions.

SUMMARY

Embodiments are disclosed for a system for reducing collisions in communications utilizing a media access control (MAC) data communication protocol and/or a time division multiple access-based (TDMA-based) data communication protocol, such as an Aloha protocol or an MS-Aloha protocol. The system may include electronic devices (such as electronic devices of a vehicular ad-hoc network (VANET)). In the system, a first electronic device may receive a communication from a second electronic device that may include a channel and a message that the second electronic device is ready to transmit. The first electronic device may then recognize information (such as frame information) on the channel. Next, the first device accesses a first table and changes the communication path to a path including two or less hops, when the information on the channel includes three-hop configuration information. Alternatively, the first device accesses a second table, when the information on the channel does not include three-hop configuration information. Accordingly, the first table may include three-hop slot information based on the three-hop configuration information, and the second table may include two-or-less-hop slot information based on two-or-less-hop configuration information. Furthermore, the first device may access a third table, based on information from the second table and the first table. Consequently, the third table may include two-or-less-hop slot information that is not included as part of the three-hop slot information.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system, such as a collision avoidance system (CAS), may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

It is to be understood that the following description of examples of implementations are given only for the purpose of illustration and are not to be taken in a limiting sense. The partitioning of examples in function blocks, modules or units shown in the drawings is not to be construed as indicating that these function blocks, modules or units are necessarily implemented as physically separate units. Functional blocks, modules or units shown or described may be implemented as separate units, circuits, chips, functions, modules, or circuit elements. One or more functional blocks or units may also be implemented in a common circuit, chip, circuit element or unit.

In one aspect of a system, such as a collision avoidance system (CAS), the system may facilitate reducing collisions in communications utilizing a media access control (MAC) data communication protocol and/or a time division multiple access-based (TDMA-based) data communication protocol, such as an Aloha protocol or an MS-Aloha protocol, that may include one or more electronic devices (such as electronic devices of a vehicular ad-hoc network (VANET)). One of the one or more electronic devices may include a processor and a memory device. The memory device may include processor executable instructions. The processor executable instructions, when executed by the processor, may be operable to: receive a communication from another electronic device, via a communication path. The communication may include a channel (such as a channel based on a frame period), and a message that the other electronic device is ready to transmit.

In another aspect, the instructions, when executed, may also be operable to: recognize information (such as frame information) on the channel; access a first table and change the communication path to a path including two or less hops, when the information on the channel includes three-hop configuration information; and access a second table, when the information on the channel does not include three-hop configuration information. Accordingly, the first table may include three-hop slot information based on the three-hop configuration information, and the second table may include two-or-less-hop slot information based on two-or-less-hop configuration information. The instructions, when executed, may also be operable to: access a third table, based on information from the second table and the first table. Consequently, the third table may include two-or-less-hop slot information that is not included as part of the three-hop slot information. Additionally, the instructions, when executed, may also be operable to: overwrite, based on the three-hop slot information, available slots listed in the two-or-less-hop slot information.

In another aspect, the instructions, when executed, may further be operable to: utilize a security algorithm (such as a secure hash algorithm) to map a network address (such as MAC address) of another electronic device to an index associated with the second table, third table, or the first table, when there are zero available slots in the third table, is an available slot, or a collision (such as an access collision) occurs, respectively. Further, the instructions, when executed, may also be operable to: select a corresponding slot based on the security algorithm to act as a broadcast channel when the corresponding slot becomes available.

With respect to another aspect, in a vehicular ad-hoc network (VANET), vehicles may exchange information with surrounding vehicles by broadcasting event-driven decentralized environmental notification messages (DENMs) as well as periodic cooperative awareness messages (CAMs). Based on the information, an active safety application may be able to detect dangerous situations, such as a potential collision at an intersection. The active safety application may be able to process the information in most traffic situations, including situations with a high vehicle density. The correct operation of such an exchange and others in a VANET may be ensured by a communication system, such as a system under a MAC protocol. For example, the CAS, described herein, by reducing access collisions in communications utilizing MS-Aloha, can ensure valid exchanges of information in a VANET.

Conventionally, the IEEE 802.11p standard represented a solution typically chosen for a definition of MAC layers for a VANET. With respect to IEEE 802.11p, a MAC layer may use a priority based carrier sense multiple access with collision avoidance (a priority based CSMA/CA) module. Using such a module, an electronic device, such as a mobile device, may listen to shared communications before transmitting, in order to avoid collisions. In general, an electronic device communicating a higher priority message waits for a shorter period to access a channel, using a smaller contention window and arbitration inter-frame space. However, in using such a module, collision may not be effectively avoided for broadcast (un-acknowledged) transmissions. Given this, effects of hidden electronic devices may occur, unless a Request to Send/Clear to Send (RTS/CTS) module is applied, for example.

Alternatively, time division multiple access (TDMA) based solutions, in principle, can overcome some of the drawbacks in using a CSMA/CA module. TDMA does this via providing prompt access, variable bandwidth, and reliable channels, for example. One example TDMA based protocol is RR-ALOHA. In RR-ALOHA, the wireless medium may be structured in a slotted fashion and slots are grouped into virtual frames (such as See VF 1 and VF 2 of FIG. 1A). An electronic device, before transmitting, senses the wireless medium and selects an unassigned slot corresponding to a slot in a virtual frame as its broadcast channel. In a broadcast channel, an electronic device may propagate its view of frame allocation in a fixed structure, also known as frame information (FI), which is appended to a virtual frame or MAC gram (such as See VF 1). Besides FI, a frame may contain a payload as well. An FI can specify whether a slot is free or busy, and/or to which electronic device a communication and payload may be allocated. Particularly, a slot may be busy where a packet has been correctly received or transmitted by the electronic device; otherwise, the slot is free. In the case of a busy slot, an FI may contain an identification of a transmitting electronic device. Based on a received FI, an electronic device marks a slot as reserved, busy, or available. In RR-ALOHA, an available slot can be used for new access attempts. Upon accessing an available slot, the transmitting electronic device may be recognized by a receiving device after a certain amount of slots (or a time frame) of successful transmission. In this case, the transmitting electronic device codes the slot in the FI as busy.

Figure 1A:
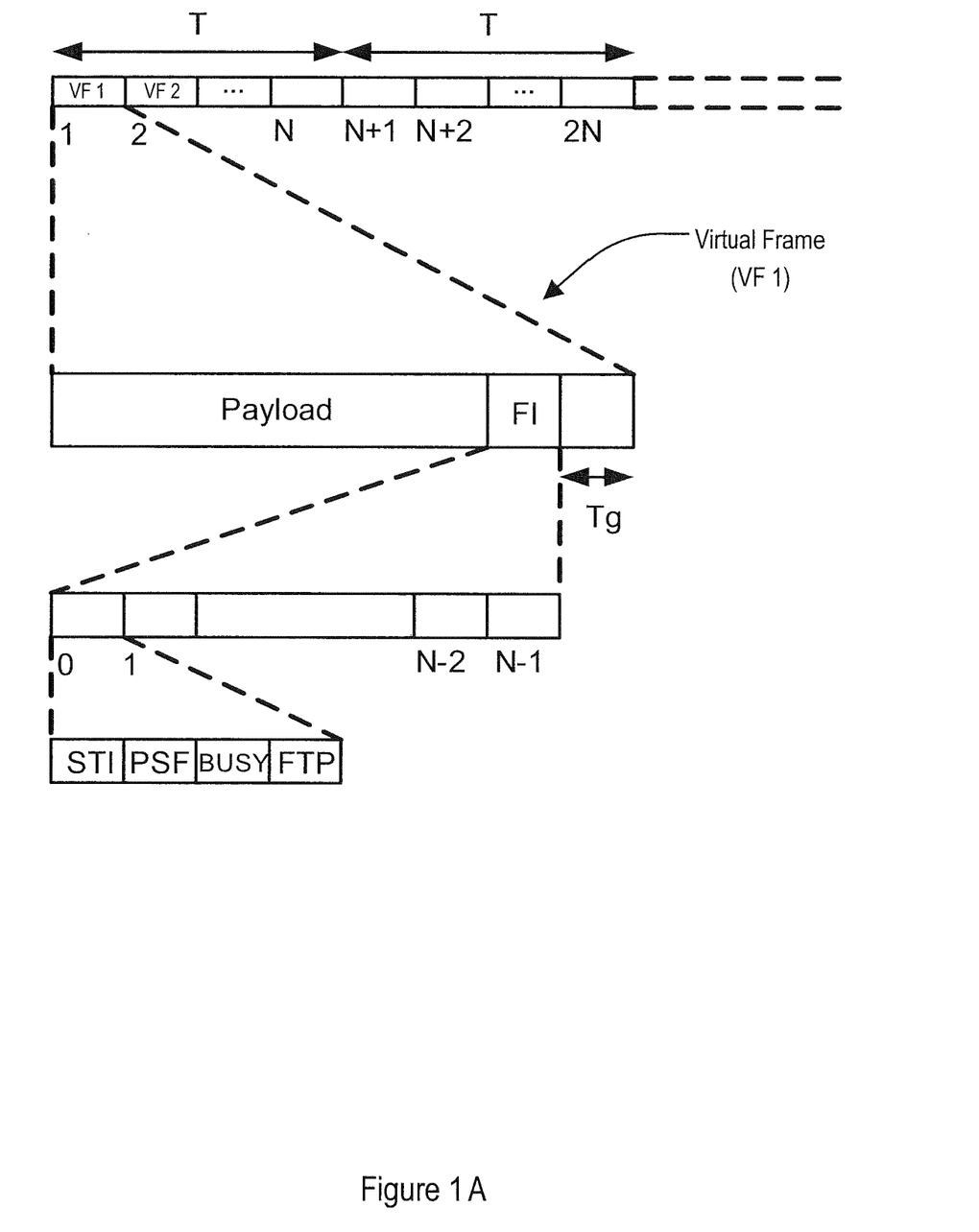
FIG. 1A illustrates a group of example virtual frames associated with the RR-ALOHA protocol.

Also, as shown in FIG. 1A, a FI may be made up of the following components. A source temporary identifier (STI), which may be a label of a node whose transmission has been received by another node, and which may be 8 bits, for example. A priority status field (PSF), which may be a field indicating a priority of data transmitted to a slot, and may be 2 bits, for example. A flag indicating whether a slot is free or busy (BUSY), which may be 1 bit, for example. A flag indicating whether a received packet is a broadcast packet (FTP), which may be 1 bit as well, for example. As described, the FI may be 12 bits, for example.

A system utilizing the RR-Aloha protocol may perform well given all nodes of network are interconnected. However, in the case of a vehicle system that may encounter complex scenarios, the RR-ALOHA protocol may be subject to potential drawbacks, such as in a case of network nodes having a high amount of mobility, or in a case of a network in which nodes frequently enter and depart the network. This may also include a network where nodes of the network may not be interconnected at any given time. Moreover, a RR-ALOHA based system may have reduced performance due to a lack of modules that can limit access collisions, which are collisions that occur when multiple electronic devices in a broadcast channel are setting-up phase transmit on a same available slot. Another type of collision, a merging collision, occurs when transmissions of multiple active electronic devices belonging to disjoint One-Hop-clusters (OH-clusters) merge at a same slot. The merging of two or more disjoint OH-Clusters may occur as a consequence of two kinds of events: a new terminal is activated between two previously disjoint OH-Clusters, and/or a moving node causes the merging. In any case, when the merging of OH-Clusters occurs, the terminals transmitting on the same slot have to reschedule, thus slots losses occur. With both types of collisions, transmissions may not be successful and wireless radio resources may be wasted.

Figure 1B:
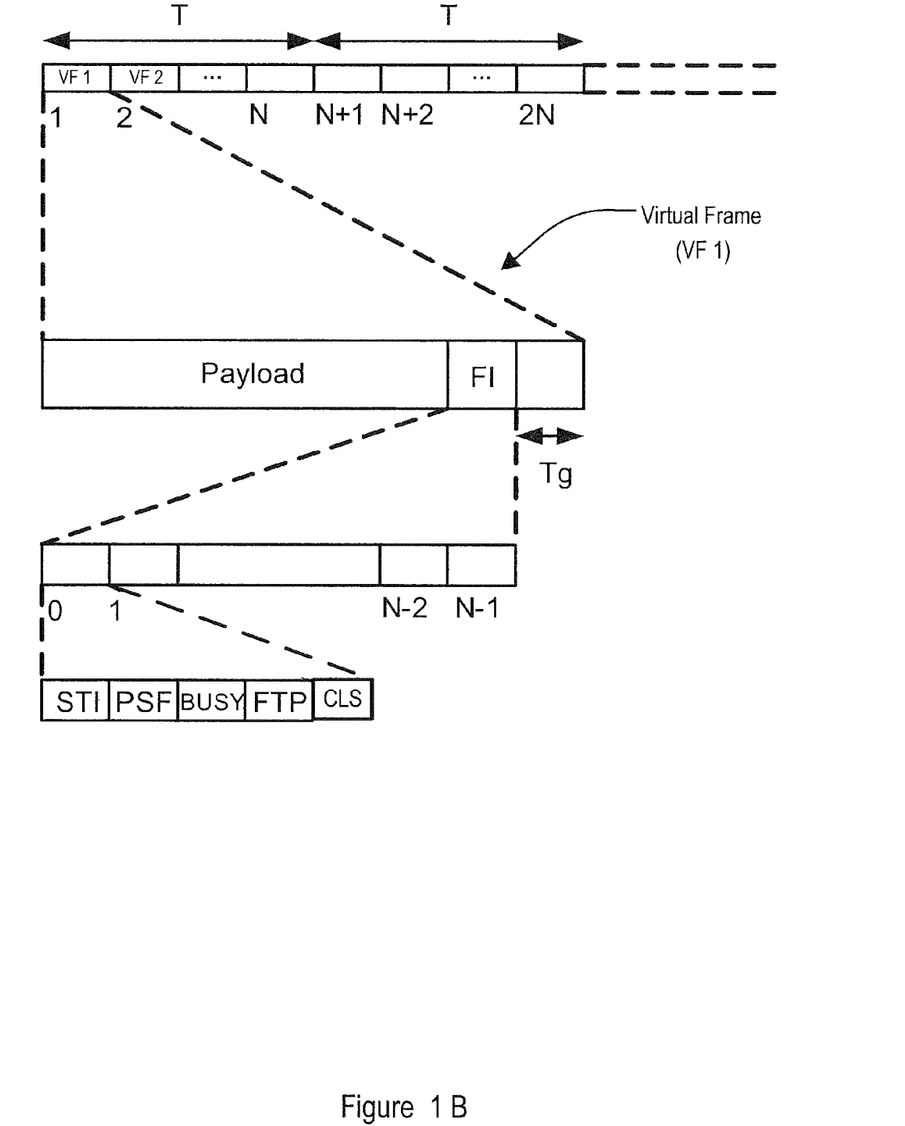
FIG. 1B illustrates a group of example virtual frames associated with the MS-ALOHA protocol.

With respect to merge collisions, RR-Aloha-plus may facilitate a device detecting such collisions per slot. This protocol also generates its own FI. Detecting a merge collision, may be based on vectors of the device's transmitted FI, where the vectors are associated with frames transmitted by the transmitting electronic device and/or other nodes of a network utilizing RR-Aloha-plus. Distinct from RR-Aloha, this protocol includes an additional component (CLS) in its FI that identifies whether there is a collision in a slot (such as See FIG. 1B). This component may be 1 bit, for example. Given this example, the additional CLS bit combined with the BUSY bit, from the last example protocol, may indicate a reason for a collision detected by an electronic device. For example, a channel state may be described by the two aforementioned bits (BUSY, CLS), with the following three possible configurations: (BUSY:0, CLS:0), (BUSY:1, CLS:0) and (BUSY:0, CLS:1). With this configuration, merging collisions may be partly determined. However, there is a limit to this configuration. It does not limit an amount of hops over which information of the FI can be forwarded, which results in a limited amount of slot reuse. Resetting a channel's state at a frame may facilitate avoiding reentry of previously slotted information; however, a frame period may be too slow considering slotting may wait for a reset per slot entry. In this example, information can be forwarded hop-by-hop (such as per hop from one device to another) several times, before the end of a frame. Furthermore, this channel reset may disable continuous reservations, which can cause large reservation overhead and delay in a communication.

MS-Aloha resolves the aforementioned issue associated with RR-Aloha-plus, by limiting a number of hops that can occur in a communication. MS-Aloha may assure that information is not forwarded more than two-hops from a transmitting node. Using the above example, MS-Aloha may use a "not transmitting" configuration (BUSY:1, CLS:1) to track the hop count. In practice when a new FI is received and a vector of state (BUSY:1, CLS:1) is recognized, an electronic device may recognize that a third hop has been reached and take appropriate action, such as changing a communication path of the communication, to ensure that the next transmission is at most two-hops from a transmitting node.

Although MS-ALOHA limits merge collisions and an amount of hops in a communication between devices, access collisions are not alleviated by this protocol. Fortunately, as mentioned above, in one aspect of the system, such as the CAS, the system can reduce access collisions in communications utilizing MS-Aloha.

Figure 2:
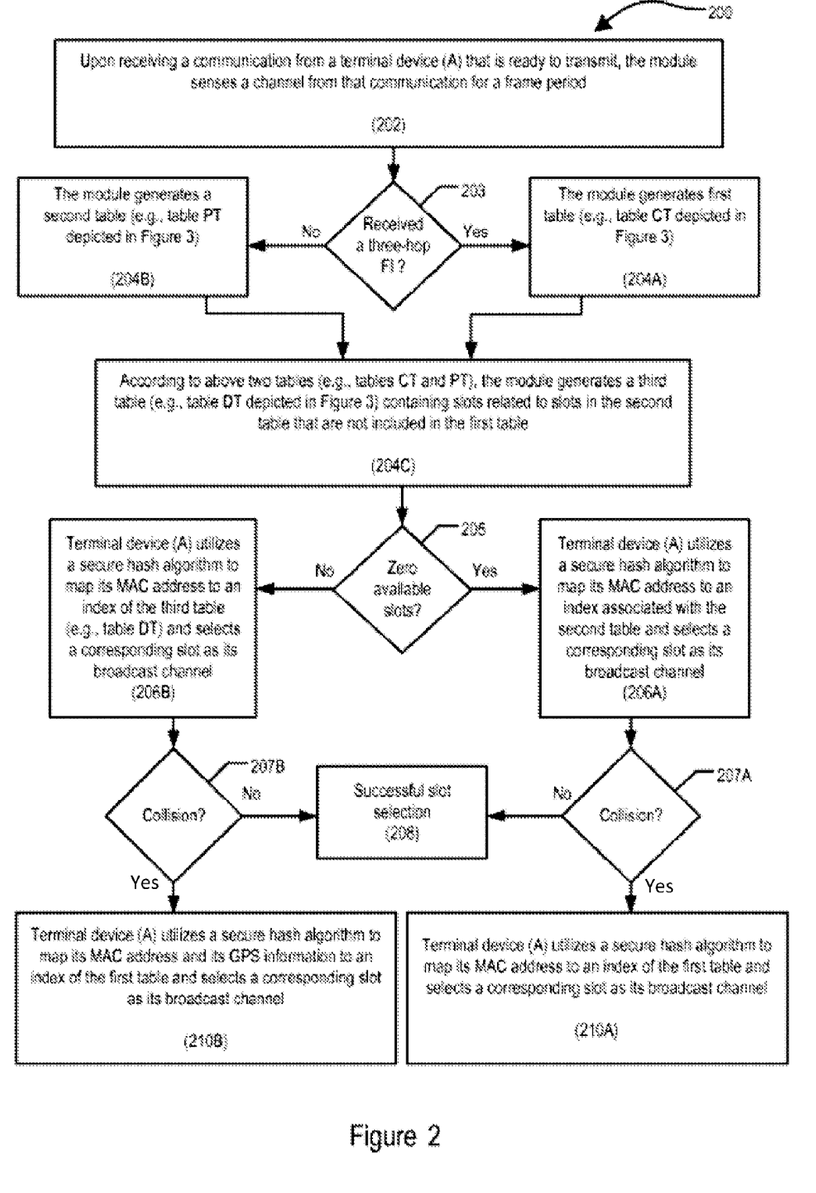
FIG. 2 illustrates an example method performed by an aspect of the system.

For example, a module may prevent multiple electronic devices from communicating on one available slot (such as may prevent an access collision). FIG. 2 illustrates an example operational flow diagram (200) that may be performed by the module to provide the aforementioned functionality. Upon receiving a communication from an electronic device (such as electronic device A of FIG. 3) that is ready to transmit, the module may sense a channel from that communication for a frame period (step 202). The module may also access three slot tables (such as tables PT, CT, and DT depicted in FIG. 3) upon receiving and recognizing multiple sets of information on a channel (such as multiple sets of FIs). Next, the module determines whether it has received a three-hop FI (step 203). Where the module received a three-hop FI configuration, such as [BUSY:1, CLS:1], the module may access a first table (such as table CT depicted in FIG. 3) (step 204A). Otherwise, the module accesses a second table (such as table PT depicted in FIG. 3) (step 204B). Next, according to these two tables (such as tables CT and PT), the module may access a third table (such as table DT depicted in FIG. 3) containing slots related to slots in the second table that are not included in the first table (step 204C). Also, the module may overwrite, using information from the first table, all available slots in the second table. Next, the module determines whether there are any available slots in the third table (step 205). Where the number of available slots in the third table (such as table DT depicted in FIG. 3) is zero, the electronic device may utilize a security algorithm (such as a secure hash algorithm) to map its network address to an index associated with the second table and may select a corresponding slot as its broadcast channel (step 206A). Otherwise, the electronic device may utilize a security algorithm to map its network address to an index of the third table (such as table DT) and may select a corresponding slot as its broadcast channel (step 206B). Next, the module determines whether there was a collision (respective step 207A or 207B). When there is no collision, the slot selection was successful (step 208). Otherwise, when a collision occurs and there are zero slots available in the third table, the electronic device may utilize a security algorithm to map its network address to an index of the first table and may select a corresponding slot as its broadcast channel (step 210A). When a collision occurs and there are available slots in the third table, the electronic device may utilize a security algorithm to map its network address and its GPS information to an index of the first table and may select a corresponding slot as its broadcast channel (step 210B).

Figure 3:
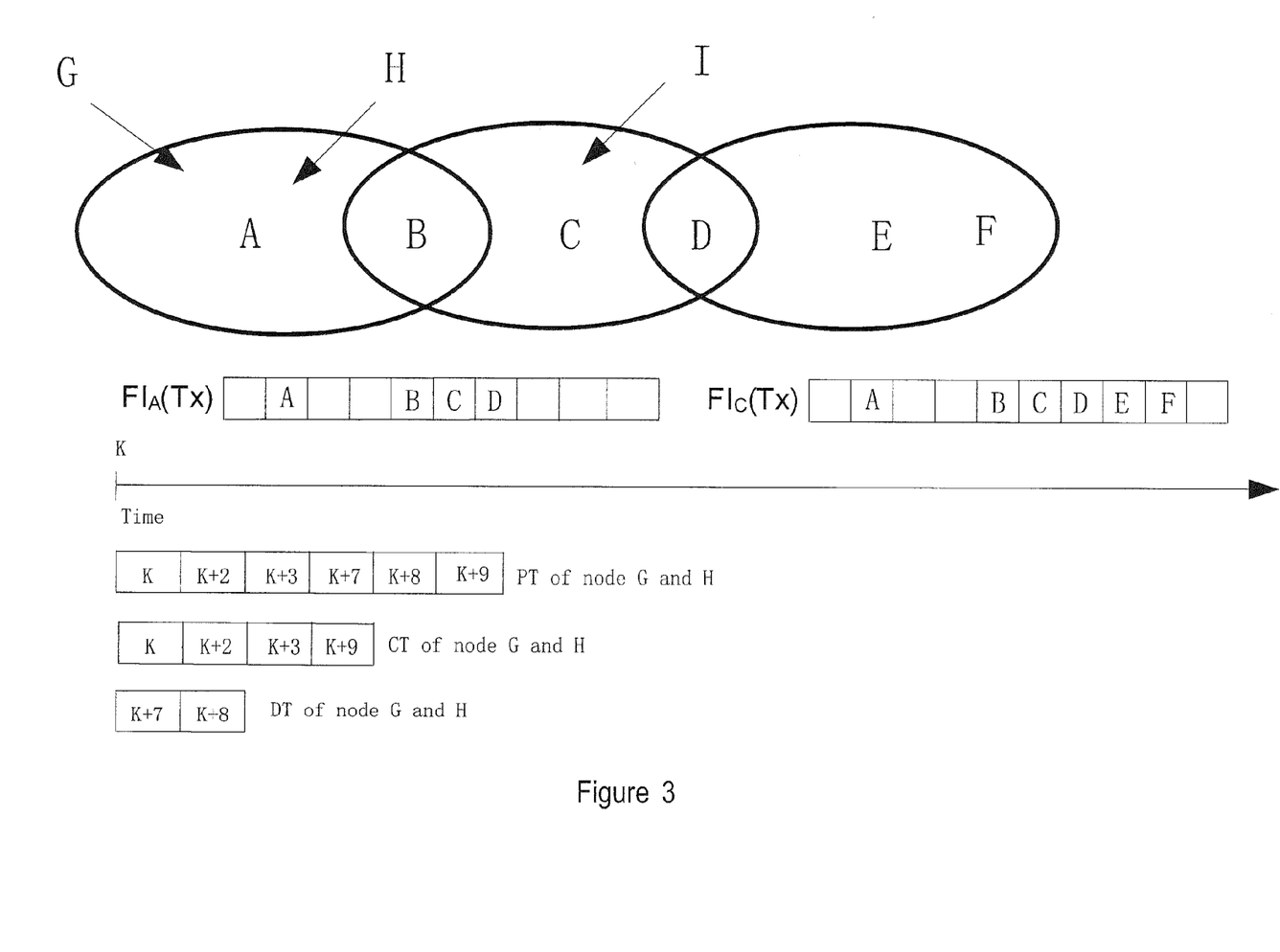
FIG. 3 illustrates example slot tables and frames that may be utilized by an aspect of the system.

In an example scenario, such as the scenario illustrated in FIG. 3, which may occur via the module, a first, second, and third node may enter an area (such as nodes G, H, and I entering an area occupied by nodes A, B, C, D, E, and F). Utilizing the aforementioned aspects of the module, the first and the second node will access slots of the third table (such as table DT); hence, a possible collision with the third node may be avoided. Meanwhile the first and the second nodes can access different slots via the security algorithm associated with the first table (such as table CT).

With further reference to FIG. 3, depicted are six nodes/electronic devices of a two-hop cluster area, A, B, C, D, E, and F, and three nodes/electronic devices entering the area, G, H, and I. Also, depicted are example FIs for node A and C, labeled $FI_A(Tx)$ an $FI_C(Tx)$. Further, depicted are tables PT, CT, and DT representing slots beginning at slot K, for communication with nodes G and H (such as slots for communicating with nodes G and H via electronic device A). Above the tables is a time axis that represents time beginning from slot K. Table PT represents a two-hop table that includes slots K, K+2, K+3, K+7, K+8, and K+9, for example. Table CT represents a three-hop table that includes slots K, K+2, K+3, and K+9, for example. Table DT represents a table that includes slots that occur in table PT, but not in table CT, for example.

Figure 4:
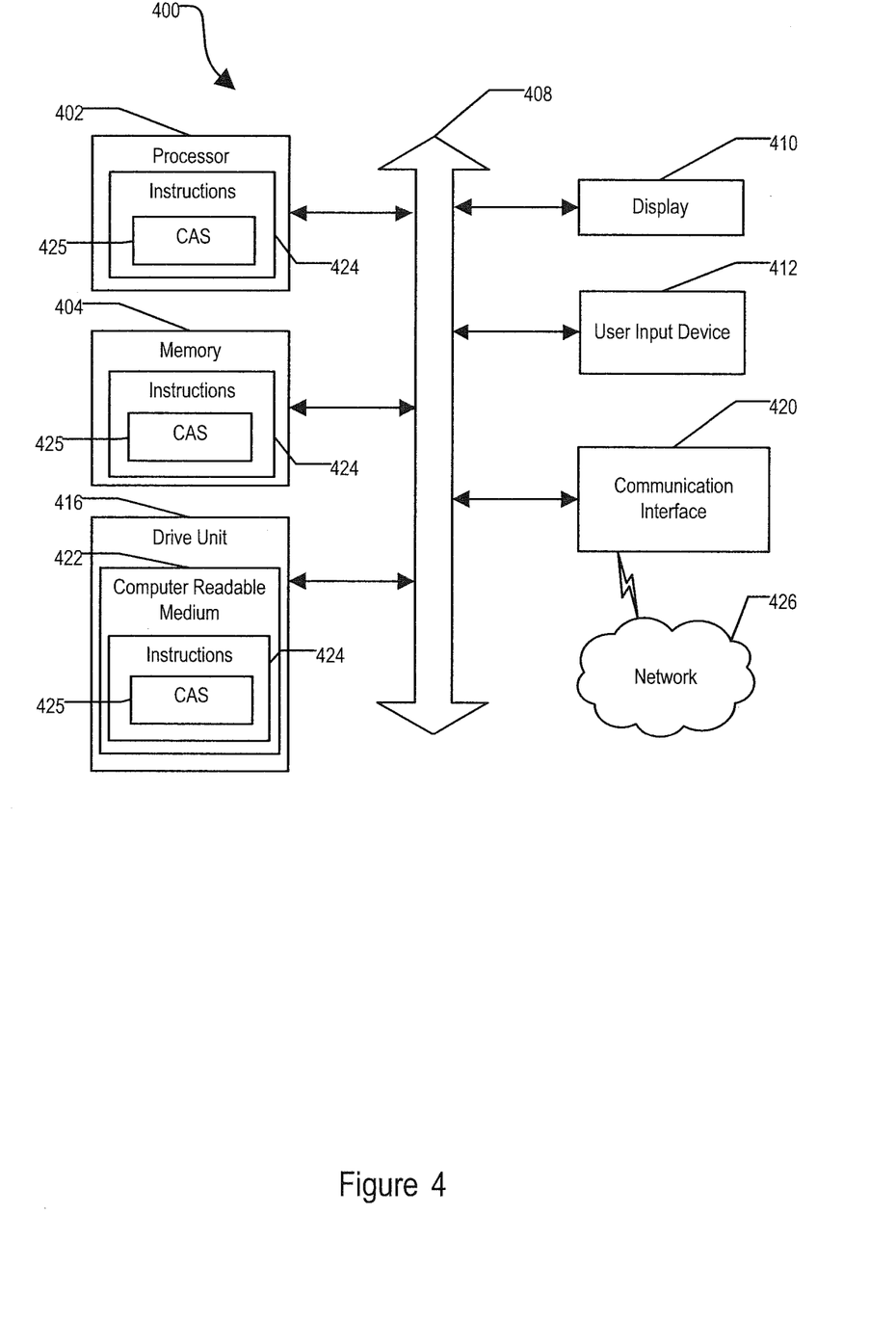
FIG. 4 is a block diagram of an example computer system that may be included or used with a component of the system.

Furthermore, one or more aspects or modules of the system, or any other device or system operating in conjunction with the system may be or may include a portion or all of one or more computing devices of various kinds, such as the computer system 400 in FIG. 4. The computer system 400 may include a set of instructions that can be executed to cause the computer system 400 to perform any one or more of the methods or computer based functions disclosed. The computer system 400 may operate as a standalone device or may be connected, such as using a network, to other computer systems or peripheral devices.

In a networked deployment, the computer system 400 may operate in the capacity of a server or as a client user computer in a server-client user network environment, as a peer computer system in a peer-to-peer (or distributed) network environment, or in various other ways. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. The computer system 400 may be implemented using electronic devices that provide voice, audio, video or data communication. While a single computer system 400 is illustrated, the term "system" may include any collection of systems or sub-systems that individually or jointly execute a set, or multiple sets, of instructions to perform one or more computer functions.

The computer system 400 may include a processor 402, such as a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually or programmed.

The term "module" may be defined to include a plurality of executable modules. The modules may include software, hardware, firmware, or some combination thereof executable by a processor, such as processor 402. Software modules may include instructions stored in memory, such as memory 404, or another memory device, that may be executable by the processor 402 or other processor. Hardware modules may include various devices, components, circuits, gates, circuit boards, and the like that are executable, directed, or controlled for performance by the processor 402.

The computer system 400 may include a memory 404, such as a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 404 includes a cache or random access memory for the processor 402. In alternative examples, the memory 404 may be separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described may be performed by the programmed processor 402 executing the instructions stored in the memory 404. The functions, acts or tasks may be independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

A computer readable medium or machine readable medium may include any non-transitory memory device that includes or stores software for use by or in connection with an instruction executable system, apparatus, or device. The machine readable medium may be an electronic, magnetic, optical, electromagnetic, infrared, or semiconductor system, apparatus, or device. Examples may include a portable magnetic or optical disk, a volatile memory such as Random Access Memory "RAM", a read-only memory "ROM", or an Erasable Programmable Read-Only Memory "EPROM" or Flash memory. A machine readable memory may also include a non-transitory tangible medium upon which software is stored. The software may be electronically stored as an image or in another format (such as through an optical scan), then compiled, or interpreted or otherwise processed.

The computer system 400 may or may not further include a display unit 410, such as a liquid crystal display (LCD), an organic light emitting diode (OLED), a flat panel display, a solid state display, a cathode ray tube (CRT), a projector, a printer or other now known or later developed display device for outputting determined information. The display 410 may act as an interface for the user to see the functioning of the processor 402, or specifically as an interface with the software stored in the memory 404 or in the drive unit 416.

The computer system 400 may include an input device 412 configured to allow a user to interact with any of the components of computer system. The input device 412 may be a plurality pad, a keyboard, or a cursor control device, such as a mouse, or a joystick, touch screen display, remote control or any other device operative to interact with the computer system 400. For example, a user of the navigation system 100 may input criteria or conditions to be considered by the navigation device 102 in calculating a route using the input device 412.

The computer system 400 may include a disk or optical drive unit 416. The disk drive unit 416 may include a computer-readable medium 422 in which one or more sets of instructions 424 or software can be embedded. The instructions 424 may embody one or more of the methods or logic described herein, including aspects or modules of the system or the CAS 425. The instructions 424 may reside completely, or partially, within the memory 404 or within the processor 402 during execution by the computer system 400. The memory 404 and the processor 402 also may include computer-readable media as discussed above.

The computer system 400 may include computer-readable medium that includes instructions 424 or receives and executes instructions 424 responsive to a propagated signal so that a device connected to a network 426 can communicate voice, video, audio, images or any other data over the network 426. The instructions 424 may be transmitted or received over the network 426 via a communication port or interface 420, or using a bus 408. The communication port or interface 420 may be a part of the processor 402 or may be a separate component. The communication port 420 may be created in software or may be a physical connection in hardware. The communication port 420 may be configured to connect with a network 426, external media, the display 410, or any other components in the computer system 400, or combinations thereof. The connection with the network 426 may be a physical connection, such as a wired Ethernet connection or may be established wirelessly as discussed later. The additional connections with other components of the computer system 400 may be physical connections or may be established wirelessly. The network 426 may alternatively be directly connected to the bus 408.

The network 426 may include wired networks, wireless networks, Ethernet AVB networks, or combinations thereof. The wireless network may be a cellular telephone network, an 802.11, 802.16, 802.20, 802.1Q or WiMax network. Further, the network 426 may be a public network, such as the Internet, a private network, such as an intranet, or combinations thereof, and may utilize a variety of networking protocols now available or later developed including, but not limited to TCP/IP based networking protocols. One or more components of the navigation system 100 may communicate with each other by or through the network 426.

The term "computer-readable medium" may include a single medium or multiple media, such as a centralized or distributed database, or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

The computer-readable medium may include a solid-state memory such as a memory card or other package that houses one or more non-volatile read-only memories. The computer-readable medium may be a random access memory or other volatile re-writable memory. The computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. The computer system 400 may include any one or more of a computer-readable medium or a distribution medium and other equivalents and successor media, in which data or instructions may be stored.

In alternative examples, dedicated hardware implementations, such as application specific integrated circuits, programmable logic arrays and other hardware devices, may be constructed to implement various aspects of the system. One or more examples described may implement functions using two or more specific interconnected hardware modules or devices with related control and data signals that can be communicated between and through modules, or as portions of an application-specific integrated circuit. The system may encompass software, firmware, and hardware implementations.

The system described may be implemented by software programs executable by a computer system. Implementations can include distributed processing, component/object distributed processing, and parallel processing. Alternatively, virtual computer system processing can be constructed to implement various aspects of the system.

The system is not limited to operation with any particular standards and protocols. For example, standards for Internet and other packet switched network transmission (such as TCP/IP, UDP/IP, HTML, and HTTP) may be used. Replacement standards and protocols having the same or similar functions as those disclosed may also or alternatively be used.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system for reducing collisions in communications utilizing data communication protocol, comprising:
a first electronic device, comprising:
a processor; and
a memory device, comprising processor executable instructions, where the processor executable instructions, when executed by the processor, are operable to:
receive a communication from a second electronic device, via a communication path, where the communication comprises: a channel, and a message that the second electronic device is ready to transmit;
recognize information on the channel;
access a first table and change the communication path to a path comprising two or less hops, when the information on the channel comprises three-hop configuration information, where the first table comprises three-hop slot information based on the three-hop configuration information, the three-hop slot information including representations of three-hop slots for communicating on the channel, where an availability of each three-hop slot is indicated in the first table; and
access a second table, when the information on the channel does not comprise three-hop configuration information, where the second table comprises two-or-less-hop slot information based on two-or-less-hop configuration information, the two-or-less-hop slot information including representations of two-or-less-hop slots for communicating on the channel, where an availability of each two-or-less-hop slot is indicated in the second table.

2. The system of claim 1, where the processor executable instructions, when executed by the processor, are further operable to:
access a third table, based on information from the second table and the first table, where the third table comprises two-or-less-hop slot information that is not included as part of the three-hop slot information, the third table including representations of slots included in the second table and not included in the first table.

3. The system of claim 1, where the processor executable instructions, when executed by the processor, are further operable to: overwrite, based on the three-hop slot information, available slots listed in the two-or-less-hop slot information.

4. The system of claim 1, where the processor executable instructions, when executed by the processor, are further operable to: utilize a security algorithm to map a network address of the second electronic device to an index associated with the second table, when there are zero available slots; and select a corresponding slot based on the security algorithm to act as a broadcast channel when the corresponding slot becomes available.

5. The system of claim 1, where the processor executable instructions, when executed by the processor, are further operable to: utilize a security algorithm to map a network address of the second electronic device to an index associated with the third table, when there is an available slot; and select a corresponding slot based on the security algorithm to act as a broadcast channel when the corresponding slot becomes available.

6. The system of claim 1, where the processor executable instructions, when executed by the processor, are further operable to: utilize a security algorithm to map a network address of the second electronic device to an index associated with the first table, when a collision occurs; and select a corresponding slot based on the security algorithm to act as a broadcast channel when the corresponding slot becomes available.

7. The system of claim 6, where the collision is an access collision.

8. The system of claim 1, where the data communication protocol is an Aloha protocol.

9. The system of claim 1, where the data communication protocol is a Mobile Slotted Aloha (MS-Aloha) protocol.

10. The system of claim 1, where the channel is based on a frame period.

11. The system of claim 1, where the recognized information on the channel is frame information, and wherein the channel is structured in a slotted fashion where slots are grouped into virtual frames, each slot of the first table and the second table corresponding to a slot in a virtual frame for communication on the channel.

12. The system of claim 1, where the first electronic device and the second electronic device are nodes of a vehicular ad-hoc network (VANET).

13. A method of a first electronic device for reducing collisions in communications utilizing a time division multiple access-based (TDMA-based) communication protocol, comprising:
accessing the first table and changing a communication path to a path comprising two or less hops, when frame information associated with a TDMA channel comprises three-hop configuration information, where the first table comprises a three-hop TDMA slot information based on the three-hop configuration information, the three-hop TDMA slot information including representations of three-hop slots for communicating with one or more nodes on the channel via a first electronic device;
accessing a second table, when the frame information associated with the TDMA channel does not comprise three-hop configuration information, where the second table comprises two-or-less-hop TDMA slot information based on two-or-less-hop configuration information, the two-or-less-hop TDMA slot information including representations of two-or-less-hop slots for communicating with the one or more nodes on the channel via the first electronic device; and
accessing a third table, based on information from the second table and the first table, where the third table comprises two-or-less-hop TDMA slot information that is not included as part of the three-hop TDMA slot information, the third table including representations of slots included in the second table and not included in the first table.

14. The method of claim 13, further comprising:
prior to the accessing of the first, second, and third tables, receiving a communication from a second electronic device, where the communication comprises the frame information; and
prior to the accessing of the first, second, and third tables and subsequent to the receiving of the communication from the electronic device, recognizing the frame information associated with the TDMA channel.

15. The method of claim 13, further comprising: overwriting, based on the three-hop TDMA slot information, available TDMA slots listed in the two-or-less-hop TDMA slot information.

16. The method of claim 14, further comprising:
utilizing a security algorithm to map a network address of the second electronic device to an index associated with the second table, when there are zero available TDMA slots;
utilizing the security algorithm to map the network address of the second electronic device to an index associated with the third table, when there is an available TDMA slot;
utilizing the security algorithm to map the network address of the second electronic device to an index associated with the first table, when a collision occurs; and
selecting a corresponding TDMA slot based on the security algorithm to act as a broadcast channel when the corresponding TDMA slot becomes available.

17. The method of claim 16, where the collision is a TDMA access collision.

18. The method of claim 14, where the first electronic device is a node of a vehicular ad-hoc network (VANET).

19. An electronic device comprising:
a processor; and
memory storing instructions executable by the processor to:
communicate with an other electronic device utilizing a time division multiple access-based (TDMA-based) communication protocol; access a first table, based on frame information associated with a TDMA channel, access at least two of:
a first table, where the frame information comprises three-hop configuration information representing three-hop slots for communication on the channel and where the frame information was received during the communication with the other electronic device, and
a second table, based on frame information associated with a TDMA channel, where the frame information comprises two-or-less-hop configuration information representing two-or-less-hop slots for communication on the channel and where the frame information was received during the communication with the other electronic device; and
access a third table, based on information from the second table and the first table, the third table including representations of slots included in the second table and not included in the first table.

20. The electronic device of claim 19, where:
the first table comprises three-hop TDMA slot information, based on the three-hop configuration information;
the second table comprises two-or-less-hop TDMA slot information, based on the two-or-less-hop configuration information; and
the third table comprises two-or-less-hop TDMA slot information that is not included as part of the three-hop TDMA slot information.

* * * * *